United States Patent
Sugawara

(10) Patent No.: US 11,764,663 B2
(45) Date of Patent: Sep. 19, 2023

(54) INTEGRATED CIRCUIT AND POWER SUPPLY CIRCUIT

(71) Applicant: FUJI ELECTRIC CO., LTD., Kawasaki (JP)

(72) Inventor: Takato Sugawara, Nagano (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 296 days.

(21) Appl. No.: 17/329,802

(22) Filed: May 25, 2021

(65) Prior Publication Data

US 2021/0281163 A1 Sep. 9, 2021

Related U.S. Application Data

(63) Continuation of application No. PCT/JP2020/021807, filed on Jun. 2, 2020.

(30) Foreign Application Priority Data

Jun. 21, 2019 (JP) .................................. 2019-115104

(51) Int. Cl.
*H02M 1/32* (2007.01)
*H02M 1/42* (2007.01)
*H02M 3/335* (2006.01)

(52) U.S. Cl.
CPC .......... *H02M 1/32* (2013.01); *H02M 1/4208* (2013.01); *H02M 3/335* (2013.01)

(58) Field of Classification Search
CPC ....... H02M 1/32; H02M 1/4208; H02M 3/335
See application file for complete search history.

(56) References Cited

U.S. PATENT DOCUMENTS

| 8,953,348 B2* | 2/2015 | Sugawara | ............. H02M 3/156 323/222 |
| 2010/0165683 A1* | 7/2010 | Sugawara | ........... H02M 1/4225 363/126 |

(Continued)

FOREIGN PATENT DOCUMENTS

| JP | 2002-051563 A | 2/2002 |
| JP | 2003-219635 A | 7/2003 |

(Continued)

OTHER PUBLICATIONS

International Search Report for PCT/JP2020/021807, dated Aug. 18, 2020.

*Primary Examiner* — Rafael O De Leon Domenech
(74) *Attorney, Agent, or Firm* — Rabin & Berdo, P.C.

(57) ABSTRACT

A power supply circuit that generates an output voltage from an AC voltage inputted thereto. The power supply circuit includes a rectifier circuit rectifying the AC voltage, an inductor receiving a rectified voltage from the rectifier circuit, a transistor controlling an inductor current flowing through the inductor, and an integrated circuit switching the transistor based on the inductor current and the output voltage. The integrated circuit includes a sample-and-hold circuit that samples-and-holds a voltage corresponding to the rectified voltage in a predetermined timing, an output circuit that outputs a limit voltage based on the voltage held by the sample-and-hold circuit, indicating a limit value for limiting the inductor current, and a signal output circuit that receives the limit voltage and a voltage corresponding to the inductor current, to thereby output a signal to turn off the transistor upon determining that a current value of the inductor current exceeds the limit value.

9 Claims, 10 Drawing Sheets

(56) References Cited

U.S. PATENT DOCUMENTS

| | | | | |
|---|---|---|---|---|
| 2012/0201063 A1* | 8/2012 | Sugawara | ............. | H02M 3/156 |
| | | | | 363/89 |
| 2016/0241134 A1* | 8/2016 | Maruyama | .......... | H02M 1/4225 |
| 2018/0351396 A1* | 12/2018 | Chen | ................. | H02M 3/33576 |
| 2019/0044435 A1* | 2/2019 | Kim | .................... | H02M 1/4225 |

FOREIGN PATENT DOCUMENTS

| JP | 3677198 B2 | 7/2005 |
|---|---|---|
| JP | 2009-011147 A | 1/2009 |
| JP | 2011-103737 A | 5/2011 |
| JP | 2014-143791 A | 8/2014 |
| JP | 2016-152679 A | 8/2016 |

\* cited by examiner

INTEGRATED CIRCUIT AND POWER SUPPLY CIRCUIT

CROSS-REFERENCE TO RELATED APPLICATIONS

This is a continuation application of International Patent Application No. PCT/JP2020/021807 filed Jun. 2, 2020, which claims the benefit of priority to Japanese Patent Application No. 2019-115104 filed Jun. 21, 2019, the entire contents of each of which the entire contents of each of which are incorporated herein by reference.

BACKGROUND

Technical Field

The present disclosure relates to an integrated circuit and a power supply circuit.

Description of the Related Art

A common power factor correction circuit includes an overcurrent protection circuit that protects a transistor from overcurrent by turning off the transistor when an inductor current exceeds a predetermined value indicating the overcurrent (for example, Japanese Patent Application Publication No. 2009-11147).

When an alternating-current (AC) voltage inputted to the power factor correction circuit rises rapidly, the inductor current increases accordingly. In this case, even if the inductor current is smaller than the predetermined value indicating overcurrent, the inductor current may be large enough to generate a surge voltage in the transistor. Since it is impossible to avoid such a surge voltage with the overcurrent protection circuit, the characteristics of the transistor may deteriorate.

The present disclosure is directed to provision of an integrated circuit capable of appropriately protecting a transistor that controls an inductor current.

SUMMARY

A first aspect of the present disclosure is an integrated circuit for a power supply circuit configured to generate an output voltage from an alternating-current (AC) voltage inputted thereto, the power supply circuit including a rectifier circuit configured to rectify the AC voltage, an inductor configured to receive a rectified voltage from the rectifier circuit, and a transistor configured to control an inductor current flowing through the inductor, the integrated circuit being configured to switch the transistor based on the inductor current and the output voltage, the integrated circuit comprising: a sample-and-hold circuit configured to sample and hold a voltage corresponding to the rectified voltage in a predetermined timing; an output circuit configured to output a limit voltage based on the voltage held by the sample-and-hold circuit, the limit voltage indicating a limit value for limiting the inductor current; and a first signal output circuit configured to receive the limit voltage and a voltage corresponding to the inductor current, and to thereby output a first signal to turn off the transistor upon determining that a current value of the inductor current exceeds the limit value.

A second aspect of the present disclosure is a power supply circuit configured to generate an output voltage from an alternating-current (AC) voltage inputted thereto, the power supply circuit comprising: a rectifier circuit configured to rectify the AC voltage; an inductor configured to receive a rectified voltage from the rectifier circuit; a transistor configured to control an inductor current flowing through the inductor; and an integrated circuit configured to switch the transistor based on the inductor current and the output voltage, the integrated circuit including a sample-and-hold circuit configured to sample and hold a voltage corresponding to the rectified voltage in a predetermined timing, an output circuit configured to output a limit voltage based on the voltage held by the sample-and-hold circuit, the limit voltage indicating a limit value for limiting the inductor current, and a signal output circuit configured to receive the limit voltage and a voltage corresponding to the inductor current, and to thereby output a signal to turn off the transistor upon determining that a current value of the inductor current exceeds the limit value.

DETAILED DESCRIPTION

At least following matters will become apparent from the description of the present specification and the accompanying drawings.

Embodiments

Figure 1:
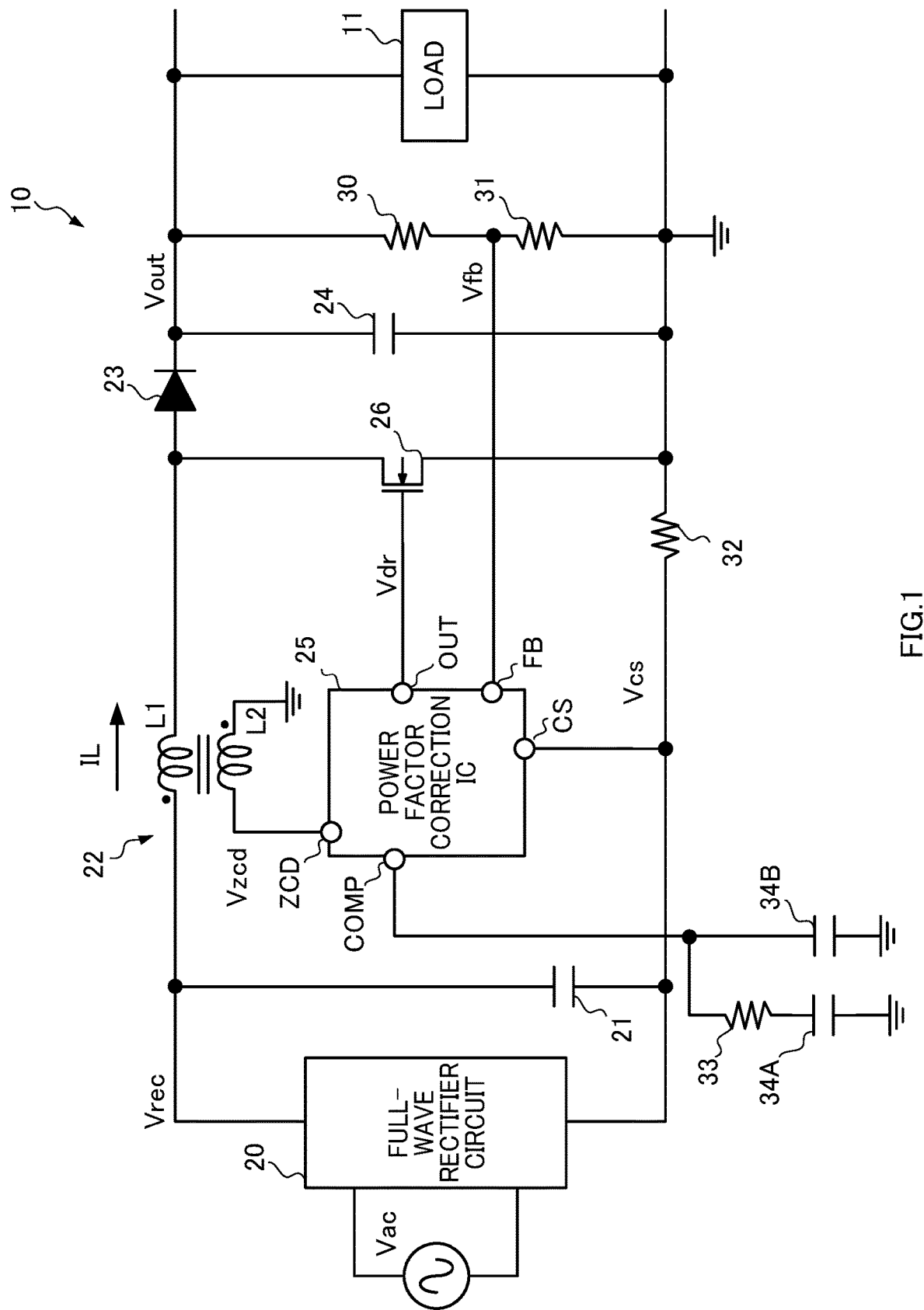
FIG. 1 is a diagram illustrating an example of an AC-DC converter 10.

FIG. 1 is a diagram illustrating a configuration of an AC-DC converter 10 according to an embodiment of the present disclosure. The AC-DC converter 10 is a boost chopper type power supply circuit that generates an output voltage Vout at a target level from an AC voltage Vac of a commercial power supply.

A load 11 is an electronic device that operates with a DC-DC converter and/or a direct-current (DC) voltage, for example.

<<<Outline of AC-DC Converter 10>>>

The AC-DC converter 10 includes a full-wave rectifier circuit 20, capacitors 21, 24, 34A, and 34B, a transformer 22, a diode 23, a power factor correction IC 25, an NMOS transistor 26, and resistors 30 to 33.

The full-wave rectifier circuit 20 applies a rectified voltage Vrec, which is obtained by full-wave rectifying the predetermined AC voltage Vac applied thereto, to the capacitor 21 and a primary coil L1 of the transformer 22. In this case, the AC voltage Vac is a voltage of 100 to 240 V having a frequency of 50 to 60 Hz, for example.

The capacitor 21 is an element that smooths the rectified voltage Vrec, and the transformer 22 includes the primary coil L1 and an auxiliary coil L2 magnetically coupled to the primary coil L1. Here, in an embodiment of the present disclosure, the auxiliary coil L2 is formed by winding such that a voltage generated in the auxiliary coil L2 has a polarity opposite to a polarity of a voltage generated in the primary coil L1. A voltage Vzcd generated in the auxiliary coil L2 is applied to a terminal ZCD.

The primary coil L1 corresponds to an "inductor", and a current flowing through the primary coil L1 is an "inductor current IL". Note that the rectified voltage Vrec is applied directly to the primary coil L1, but may be applied to the primary coil L1 via an element such as a resistor (not illustrated), for example.

In addition, the primary coil L1 configures a boost chopper circuit with the diode 23, the capacitor 24, and the NMOS transistor 26. Accordingly, a charge voltage of the capacitor 24 results in the DC output voltage Vout. Note that the output voltage Vout is 400 V, for example.

The power factor correction IC 25 is an integrated circuit that controls switching of the NMOS transistor 26 such that the level of the output voltage Vout achieves a target level (for example, 400 V) while improving the power factor of the AC-DC converter 10. Specifically, the power factor correction IC 25 drives the NMOS transistor 26 based on the inductor current IL flowing through the primary coil L1 and the output voltage Vout.

The power factor correction IC 25 is provided with terminals CS, FB, ZCD, COMP, and OUT, and the power factor correction IC 25 will be described later in detail. Note that, although the power factor correction IC 25 is provided with terminals other than the above-described five terminals CS, FB, ZCD, COMP, and OUT, they are omitted for the sake of convenience.

The NMOS transistor 26 is a transistor for controlling the power to the load 11 of the AC-DC converter 10. In an embodiment of the present disclosure, the NMOS transistor 26 is a metal oxide semiconductor (MOS) transistor, however, it is not limited thereto. The NMOS transistor 26 may be other transistors, such as a bipolar transistor, as long as the NMOS transistor 26 is a transistor capable of controlling the power. The NMOS transistor 26 has a gate electrode coupled to the terminal OUT so as to be driven in response to a signal from the terminal OUT.

The resistors 30 and 31 configure a voltage divider circuit that divides the output voltage Vout, to generate a feedback voltage Vfb, which is used in switching the NMOS transistor 26. The feedback voltage Vfb generated at a node at which the resistors 30 and 31 are coupled is applied to the terminal FB.

The resistor 32 detects the inductor current IL, and has one end coupled to a source electrode of the NMOS transistor 26 and the other end coupled to the terminal CS. It is assumed, in an embodiment of the present disclosure, that a voltage corresponding to the inductor current IL to be inputted to the terminal CS is a voltage Vcs.

The voltage Vcs is applied to the terminal CS from an inverting amplifier circuit (not illustrated), which inverts and amplifies a voltage generated in the resistor 32 using a voltage at a grounded source electrode of the NMOS transistor 26 as a reference (0 V), for example. In this case, the voltage Vcs, which is to be applied to the terminal CS, increases with an increase in the inductor current IL. Such positive and negative inversion may also be performed inside the power factor correction IC 25. For example, the voltage Vcs at the terminal CS may be used with the level thereof being shifted to a positive voltage by inserting a voltage divider resistor (not illustrated) between an internal power supply in the power factor correction IC 25 and the terminal CS.

The voltage Vcs according to an embodiment of the present disclosure is given by an expression (1), for example.

$$Vcs = A \times IL \quad (1)$$

where "A" is a predetermined coefficient and is a predetermined value that is determined based on an amplification factor and a resistance value of the resistor 32.

The resistor 33 and the capacitors 34A and 34B, which will be described later in detail, are elements for phase compensation of the feedback controlled power factor correction IC 25. The resistor 33 and the capacitor 34A are provided in series between the terminal COMP and the ground, and the capacitor 34B is provided in parallel with the resistor 33 and the capacitor 34A.

<<<Configuration of Power Factor Correction IC 25>>>

Figure 2:
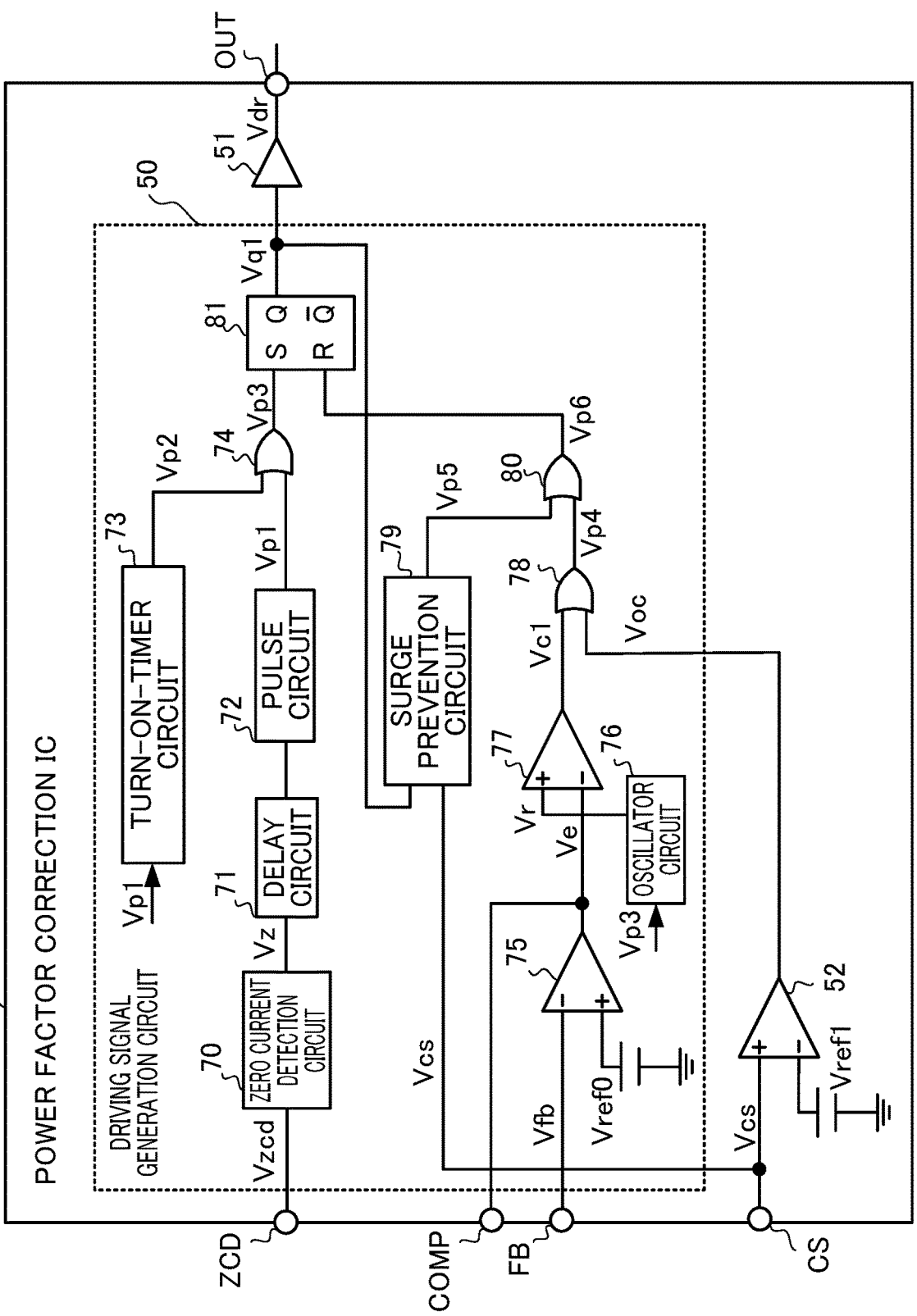
FIG. 2 is a diagram illustrating an example of a power factor correction IC 25.

FIG. 2 is a diagram illustrating an example of a configuration of the power factor correction IC 25. The power factor correction IC 25 includes a driving signal generation circuit 50, a driver circuit 51, and a comparator 52. Note that the terminals in FIG. 2 are illustrated in positions different from positions in FIG. 1 for the sake of convenience, however, the wiring, elements, and the like coupled to the corresponding terminals are the same between FIGS. 1 and 2.

<<Driving Signal Generation Circuit 50>>

A driving signal generation circuit 50 generates a driving signal Vq1 for turning on and off the NMOS transistor 26, based on the feedback voltage Vfb and the voltage Vcs corresponding to the inductor current IL. The driving signal generation circuit 50 includes a zero current detection circuit 70, a delay circuit 71, a pulse circuit 72, a turn-on-timer circuit 73, OR circuits 74, 78, and 80, an error amplifier circuit 75, an oscillator circuit 76, a comparator 77, a surge prevention circuit 79, and an SR flip-flop 81.

The zero current detection circuit 70 detects whether a current value of the inductor current IL is a "current value Ia" indicating substantially zero (hereinafter, "substantially zero" is simply referred to as zero for the sake of convenience), based on a voltage Vzcd at the terminal ZCD. Upon detecting that the current value of the inductor current IL is the "current value Ia", which is "zero", the zero current detection circuit 70 according to an embodiment of the present disclosure outputs a signal Vz at a high level (hereinafter, referred to as high or high level). In addition, the zero current detection circuit 70 includes a comparator (not illustrated) that compares the voltage Vzcd and a predetermined voltage of the auxiliary coil L2 at a time when the inductor current IL reaches the "current value Ia".

Upon receiving the high signal Vz from the zero current detection circuit 70, the delay circuit 71 outputs the high signal Vz after a delay of a predetermined period of time.

Upon receiving the high signal Vz from the delay circuit 71, the pulse circuit 72 outputs a high pulse signal Vp1.

The turn-on-timer circuit 73 outputs a pulse signal Vp2 for turning on the NMOS transistor 26, when no pulse signal Vp1 is outputted due to an interruption of the AC voltage Vac or startup of the power factor correction IC 25. Specifically, when no pulse signal Vp1 is outputted for a predetermined period of time, the high pulse signal Vp2 is outputted in every predetermined cycle.

The OR circuit 74 calculates and outputs a logical sum of the pulse signals Vp1 and Vp2. Accordingly, in an embodiment of the present disclosure, the OR circuit 74 outputs the pulse signal Vp1 or the pulse signal Vp2 as a signal Vp3.

The error amplifier circuit 75 amplifies an error between the feedback voltage Vfb applied to the terminal FB and a predetermined reference voltage Vref0. The reference voltage Vref0 is a voltage determined according to the output voltage Vout at the target level. The resistor 33 and the capacitors 34A and 34B for phase compensation are coupled between the output of the error amplifier circuit 75 and the ground via the terminal COMP. It is assumed that a voltage at a node at which the output of the error amplifier circuit 75 and the terminal COMP are coupled is a voltage Ve.

The oscillator circuit 76 outputs a ramp wave Vr having an amplitude that gradually increases, each time receiving the high signal Vp3 from the OR circuit 74.

The comparator 77 compares the magnitude between the voltage Ve and the ramp wave Vr, and outputs a signal Vc1 as a result of the comparison. Here, the comparator 77 has an inverting input terminal to which the voltage Ve is applied, and a non-inverting input terminal to which the ramp wave Vr is applied. Accordingly, when the level of the ramp wave Vr is lower than the level of the voltage Ve, the signal Vc1 is at a low level (hereinafter, low or low level), and when the level of the ramp wave Vr is higher than the level of the voltage Ve, the high signal Vc1 is high.

The OR circuit 78 calculates and outputs a logical sum of the signal Vc1 and a high signal Voc (described later) indicating the occurrence of overcurrent. Accordingly, when the signal Vc1 or the signal Voc is high, the OR circuit 78 outputs a high signal Vp4.

The surge prevention circuit 79 suppresses a surge voltage from being generated in the NMOS transistor 26 in association with an increase in the inductor current IL, when the AC voltage Vac rises rapidly, for example. When the voltage Vcs corresponding to the inductor current IL is greater than a limit voltage Vlimt, which is determined based on a previous inductor current IL, the surge prevention circuit 79 outputs a high signal Vp5 to turn off the NMOS transistor 26. The surge prevention circuit 79 will be described later in detail.

The OR circuit 80 calculates and outputs a logical sum of the signal Vp4 from the OR circuit 78 and the signal Vp5 from the surge prevention circuit 79. Accordingly, when the signal Vp4 or the signal Vp5 goes high, a signal Vp6 goes high as well.

The SR flip-flop 81 has an S input to which the signal Vp3 is inputted, and an R input to which the signal Vp6 is inputted. Accordingly, when the signal Vp3 goes high, the driving signal Vq1, which is a Q output of the SR flip-flop 81, goes high. Meanwhile, when the signal Vp6 goes high, the driving signal Vq1 goes low.

<<Driver Circuit 51>>

The driver circuit 51 is a buffer circuit that drives the NMOS transistor 26 in response to the driving signal Vq1. Specifically, the driver circuit 51 drives the NMOS transistor 26 having a large gate capacity and the like using a signal Vdr having the same logical level as the logical level of the received signal. The driver circuit 51 turns on the NMOS transistor 26 in response to the high driving signal Vq1, and turns off the NMOS transistor 26 in response to the low driving signal Vq1.

<<Comparator 52>>

The comparator 52 is an overcurrent protection circuit that prevents the inductor current IL from being in an overcurrent condition, through comparison between the voltage Vcs and a reference voltage Vref1. Note that "overcurrent" means a condition in which the inductor current IL reaches a "current value Ib" (for example, a current value that is 90% of a current value allowed for the primary coil L1 and the NMOS transistor 26).

Thus, in an embodiment of the present disclosure, the level of the reference voltage Vref1 is determined such that when the inductor current IL exceeds the "current value Ib", the voltage Vcs exceeds the reference voltage Vref1. When the inductor current IL becomes in the overcurrent condition and the voltage Vcs exceeds the reference voltage Vref1, the comparator 52 changes the level of the voltage Voc to high. As a result, the driving signal Vq1 goes low, thereby turning off the NMOS transistor 26. The comparator 52 corresponds to a "second signal output circuit", and the high voltage Voc corresponds to a "second signal".

<<<Surge Prevention Circuit 79>>>

Figure 3:
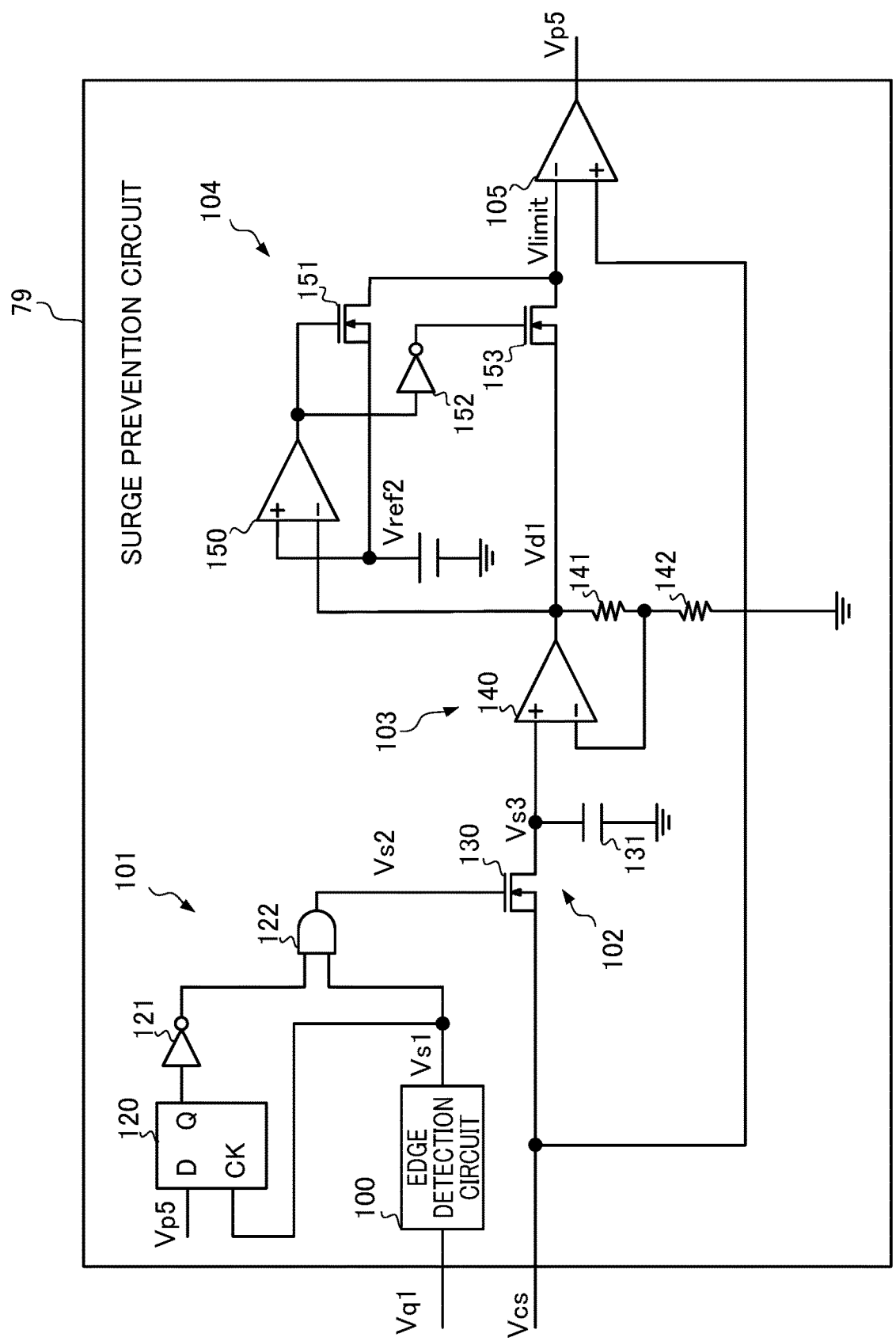
FIG. 3 is a diagram illustrating an example of a surge prevention circuit 79.

FIG. 3 is a diagram illustrating an example of the surge prevention circuit 79. The surge prevention circuit 79 samples the voltage Vcs corresponding to the inductor current IL each time the NMOS transistor 26 is turned off, and sets a "limit value Lim" for limiting the inductor current IL in the subsequent sampling cycle, based on a result of the sampling. When the inductor current IL exceeds the limit value Lim, the surge prevention circuit 79 outputs the high signal Vp5 to turn off the NMOS transistor 26.

Incidentally, in an embodiment of the present disclosure, the inductor current IL and the voltage Vcs have the relationship of the expression (1), as described above.

$$Vcs = A \times IL \tag{1}$$

Thus, although details will be described later, the surge prevention circuit 79 detects whether the inductor current IL exceeds the limit value Lim according to a result of the comparison between the voltage Vcs corresponding to the inductor current IL and a "limit voltage Vlimit" indicating the "limit value Lim".

The surge prevention circuit 79 includes an edge detection circuit 100, a sampling inhibition circuit 101, a sample-and-hold circuit 102, an amplifier circuit 103, a selection circuit 104, and a comparator 105.

<<Edge Detection Circuit 100>>

The edge detection circuit 100 outputs a pulse signal Vs1 for sampling the voltage Vcs corresponding to the inductor current IL in the timing when the NMOS transistor 26 is turned off. Specifically, the edge detection circuit 100 detects a falling edge of the driving signal Vq1, and outputs the high pulse signal Vs1.

<<Sampling Inhibition Circuit 101>>

The sampling inhibition circuit 101 inhibits the sample-and-hold circuit 102 (described later) from sampling the voltage Vcs in response to the inductor current IL exceeding the limit value Lim, in other words, in response to the voltage Vcs exceeding the limit voltage Vlimit.

Note that, in an embodiment of the present disclosure, each time the NMOS transistor 26 is turned off, the limit value Lim is set which is, for example, 1.1 times greater than the inductor current IL obtained by sampling. This will be described later in detail. Accordingly, it is possible to prevent the limit value Lim from further increasing, when the inductor current IL exceeds the limit value Lim.

The sampling inhibition circuit 101 includes a D flip-flop 120, an inverter 121, and an AND circuit 122.

The signal Vp5, which is a result of the comparison by the comparator 105 (described later) that determines whether the inductor current IL is greater than the limit value Lim is inputted to a D input of the D flip-flop 120. When the inductor current IL is greater than the limit value Lim, the comparator 105 outputs the high signal Vp5, and when the inductor current IL is smaller than the limit value Lim, the comparator 105 outputs the low signal Vp5.

Thus, when the inductor current IL is smaller than the limit value Lim at a timing when the pulse signal Vs1 is inputted to a CK input of the D flip-flop, a Q output of the D flip-flop 120 goes low.

As a result, the output of the inverter 121 is high, and thus the AND circuit 122 allows the high pulse signal Vs1 to pass therethrough. Accordingly, when the inductor current IL is smaller than the limit value Lim, a pulse signal Vs2 for sampling the voltage Vcs is outputted to the sample-and-hold circuit 102.

On the other hand, when the inductor current IL is greater than the limit value Lim at the timing when the pulse signal Vs1 is inputted to the CK input of the D flip-flop, the Q output of the D flip-flop 120 goes high.

As a result, the output of the inverter 121 is low, and thus the AND circuit 122 continuously outputs the low signal Vs2. Accordingly, when the inductor current IL is greater than the limit value Lim, the pulse signal Vs2 for sampling the voltage Vcs is not outputted to the sample-and-hold circuit 102.

<<Sample-and-Hold Circuit 102>>

The sample-and-hold circuit 102 samples and holds the inductor current IL at a time when the NMOS transistor 26 is turned off. Specifically, upon executing the high pulse signal Vs2 for performing the sampling, the sample-and-hold circuit 102 samples and holds the voltage Vcs.

The sample-and-hold circuit 102 includes an NMOS transistor 130 and a capacitor 131. Since the NMOS transistor 130 is on only during a period of time during which the high pulse signal Vs2 is received, the voltage Vcs in this period is held as a voltage Vs3 of the capacitor 131.

<<Amplifier Circuit 103>>

The amplifier circuit 103 generates a voltage Vd1 for setting the limit voltage Vlimit based on the sampled voltage Vcs. Specifically, in the amplifier circuit 103, an operational amplifier 140 amplifies the voltage Vs3 of the capacitor 131 by a factor corresponding to a resistance ratio of resistors 141 and 142 and outputs the resultant voltage. The voltage Vd1 outputted from the amplifier circuit 103 is given by an expression (2).

$$Vd1=(1+(R2/R1))\times Vs3 \qquad (2)$$

where "R2" is the resistance value of the resistor 141, "R1" is the resistance value of the resistor 142, and the voltage Vs3 is the voltage Vcs corresponding to the inductor current IL. In addition, when the voltage Vd1 is higher than a voltage Vmin described later, the voltage Vd1 results in the limit voltage Vlimit, which will be described later.

Thus, by selecting the value of "R2/R1" to adjust the limit voltage Vlimit, it is possible to set the limit value Lim to a value that is predetermined times X (for example, 1.1 times) greater than the sampled inductor current IL. Note that the amplifier circuit 103 corresponds to a "voltage generation circuit", and the voltage Vd1 corresponds to a "first voltage".

<<Selection Circuit 104>>

The selection circuit 104 compares the voltage Vd1 generated by the amplifier circuit 103 with a voltage Vref2 indicating the level of the voltage Vcs at a time when the inductor current IL reaches a predetermined "current value Ic", and outputs a voltage that increases the limit value Lim as the limit voltage Vlimit.

For example, when an amplitude of the AC voltage Vac is small amplitude with a phase angle thereof being within a range of 0°±30°, the level of the rectified voltage Vrec is low as well. As a result, when the limit value Lim is set based on the inductor current IL sampled within the range as such, the inductor current IL may be limited despite a low possibility of generation of the surge voltage.

In view of this, when the inductor current IL with respect to the voltage Vd1 is smaller than the predetermined value Ic, the selection circuit 104 sets the predetermined value Ic as the limit value Lim, and when the inductor current IL with respect to the voltage Vd1 is greater than the predetermined value Ic, the selection circuit 104 sets a value based on the voltage Vd1 as the limit value Lim. Note that the "current value Ic" is a value that is 30% of the inductor current IL when the phase angle is 90°, for example.

The selection circuit 104 includes a comparator 150, NMOS transistors 151 and 153, and an inverter 152.

The comparator 150 compares the voltage Vd1 that is predetermined times X (for example, 1.1 times) greater than the sampled inductor current IL with the voltage Vref2 indicating the "current value Ic".

Then, when the voltage Vd1 is smaller than the voltage Vref2, the comparator 150 outputs a high signal. As a result, the NMOS transistor 151 is turned on while the NMOS transistor 153 is turned off, and thus the voltage Vref2 is outputted to the comparator 105 as the limit voltage Vlimit.

On the other hand, when the voltage Vd1 is greater than the voltage Vref2, the comparator 150 outputs a low signal. As a result, the NMOS transistor 151 is turned off while the NMOS transistor 153 is turned on, and thus the voltage Vd1 is outputted to the comparator 105 as the limit voltage Vlimit. The voltage Vref2 corresponds to a "second voltage".

<<Comparator 105>>

When the voltage Vcs corresponding to the inductor current IL is greater than the limit voltage Vlimit indicating the limit value Lim, the comparator 105 outputs the high signal Vp5, and when the voltage Vcs is smaller than the limit voltage Vlimit, the comparator 105 outputs the low signal Vp5.

When the high signal Vp5 is outputted, the output of the OR circuit 80 in FIG. 2 goes high as well. As a result, the driving signal Vq1, which is the Q output of the SR flip-flop 81 is low, and thus the NMOS transistor 26 is turned off. Accordingly, the inductor current IL exceeding the limit value Lim does not flow in an embodiment of the present disclosure.

Note that the amplifier circuit 103 and the selection circuit 104 correspond to an "output circuit", the comparator 105 corresponds to a "first signal output circuit", and the high signal Vp5 corresponds to a "first signal".

====Operation of Power Factor Correction IC 25====

<<<When Predetermined AC Voltage Vac is Inputted>>>

Figure 4:
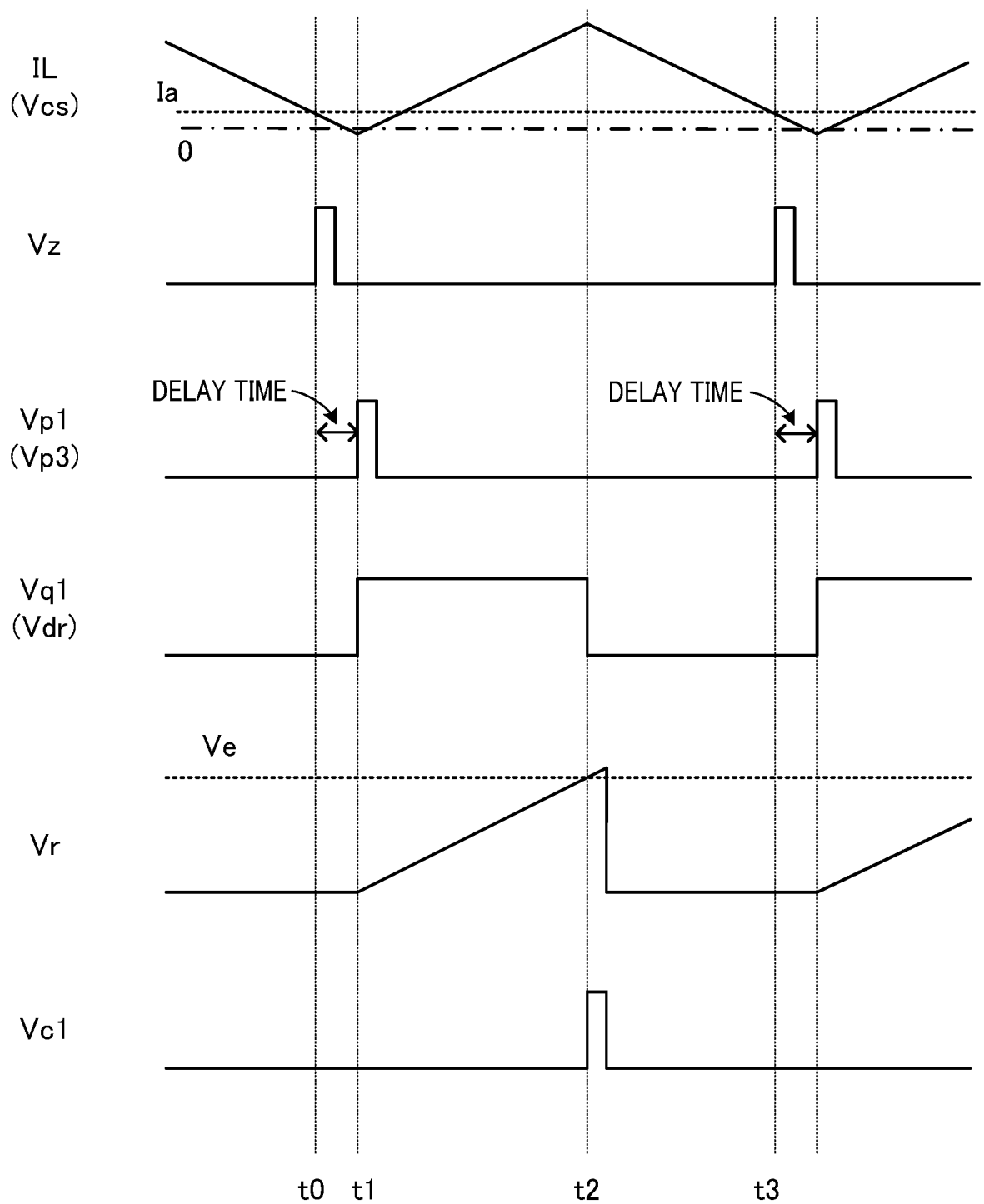
FIG. 4 is a diagram for describing an operation of a power factor correction IC 25.

The following describes, with reference to FIG. 4, an operation of the power factor correction IC 25 when the AC-DC converter 10 generates the output voltage Vout at the target level from the predetermined AC voltage Vac and supplies power to a constant load. It is assumed here that no rapid increase or overcurrent occurs in the AC voltage Vac. Accordingly, both the surge prevention circuit 79 and the comparator 52 in FIG. 2 output low signals.

First, when the inductor current IL decreases and reaches the "current value Ia", which is substantially zero, at time t0, the zero current detection circuit 70 detects that the current value of the inductor current IL is "zero" and outputs the high signal Vz.

At time t1 at which a delay time of the delay circuit 71 has elapsed since the time t0, the pulse circuit 72 outputs the pulse signal Vp1. As a result, the OR circuit 74 outputs the high pulse signal Vp3.

Then, upon receiving the pulse signal Vp3, the SR flip-flop 81 outputs the high driving signal Vq1, and thus the signal Vdr goes high as well. As a result, the NMOS transistor 26 is turned on, and the inductor current IL increases.

In addition, upon the output of the high pulse signal Vp3, the amplitude of the ramp wave Vr from the oscillator circuit 76 increases. Then, when the amplitude level of the ramp wave Vr exceeds the level of the voltage Ve at time t2, the comparator 77 changes the signal Vc1 to high. As a result, the SR flip-flop 81 is reset, and the signal Vdr goes low.

When the signal Vdr goes low, the NMOS transistor 26 is turned off, and thus the inductor current IL gradually decreases. When the inductor current IL decreases to the "current value Ia", which is substantially zero, at time t3, the operation at time t0 is repeated.

While the AC-DC converter 10 generates the output voltage Vout at the target level from the predetermined AC voltage Vac and supplies power to the constant load, the feedback voltage Vfb is constant. As a result, the voltage Ve outputted from the error amplifier circuit 75 is also constant, and thus the period of time during which the NMOS transistor 26 is on (for example, the period of time from time t1 to time t2) is also constant.

Figure 5:
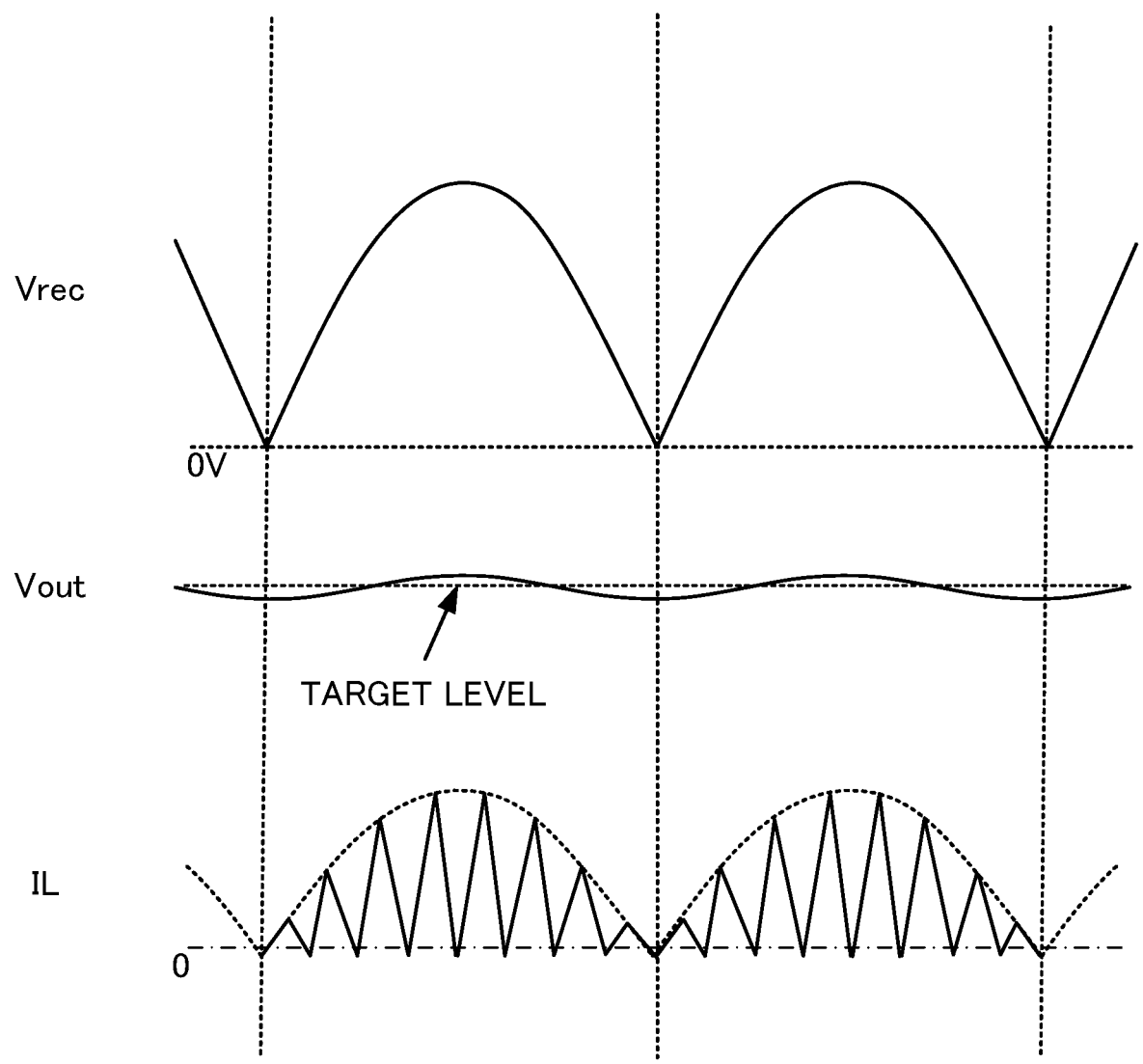
FIG. 5 is a diagram for describing an operation of an AC-DC converter 10.

In addition, when the level of the rectified voltage Vrec obtained by rectifying the AC voltage Vac rises while the NMOS transistor 26 is on, the current value of the inductor current IL increases as well. As a result, as illustrated in FIG. 5, a waveform indicating peaks of the inductor current IL has a shape similar to the shape of a waveform of the voltage Vrec, thereby improving the power factor.

<<<When AC Voltage Vac Changes Rapidly>>>

When the AC voltage Vac rapidly changes and rises, the rectified voltage Vrec rapidly increases accordingly. As a result, the inductor current IL increases, and thus the surge voltage may be generated in the NMOS transistor 26 while the NMOS transistor 26 is off.

Figure 6:
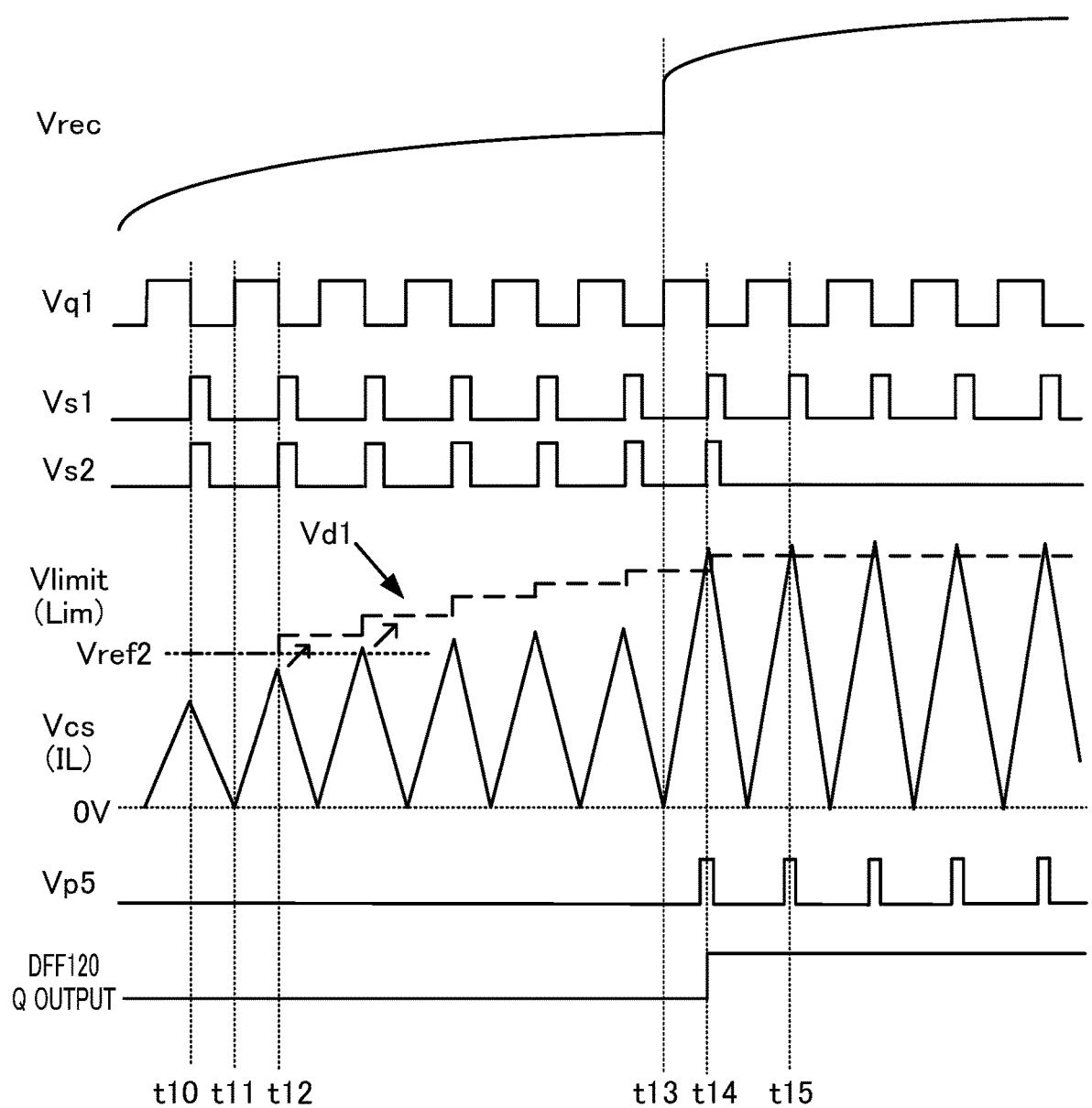
FIG. 6 is a diagram illustrating major waveforms of an AC-DC converter 10 when an AC voltage Vac changes rapidly.
Figure 7:
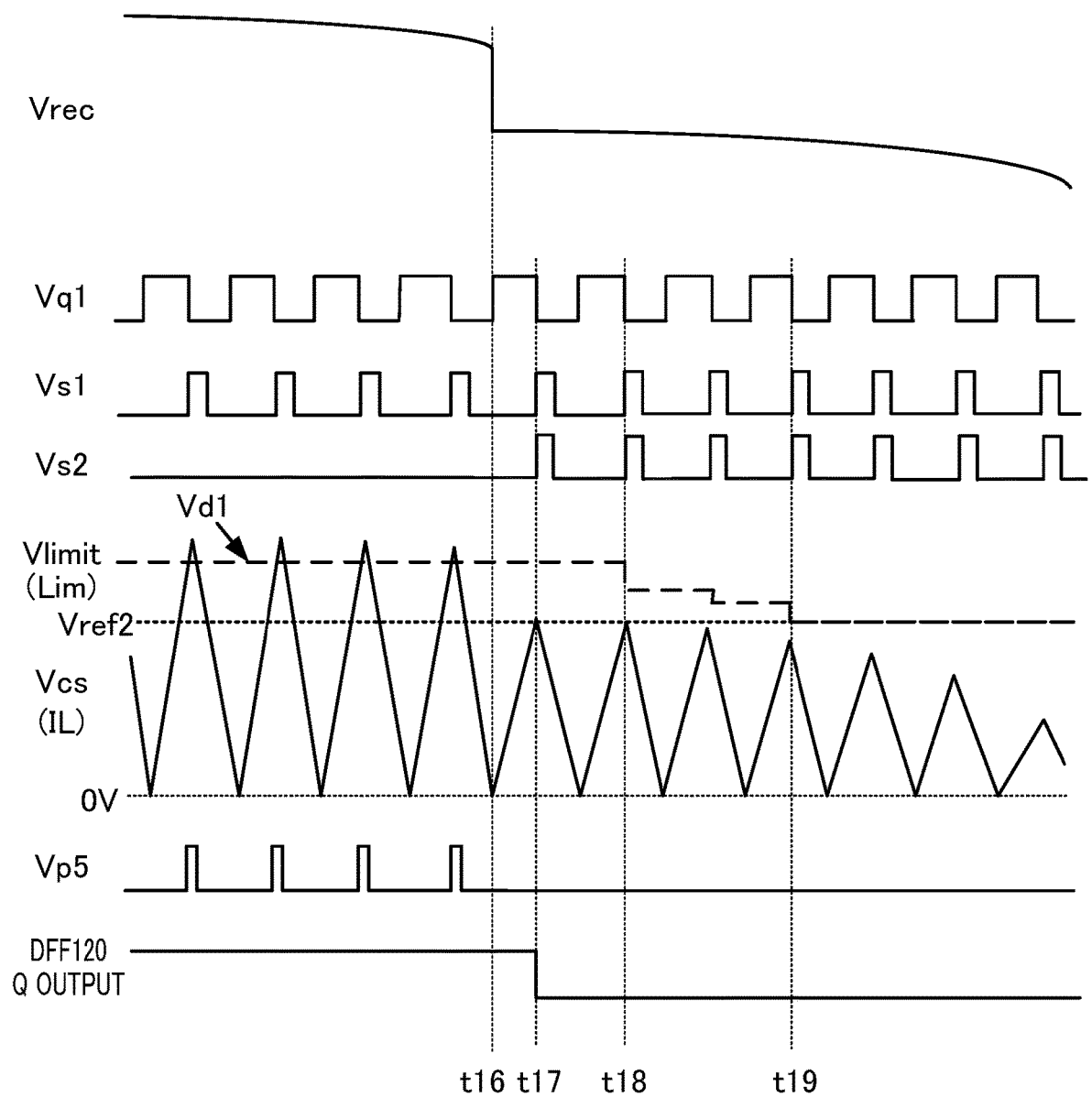
FIG. 7 is a diagram illustrating major waveforms of an AC-DC converter 10 when an AC voltage Vac changes rapidly.

The following describes, with reference to FIGS. 6 and 7 an operation of the power factor correction IC 25 to suppress the surge voltage when such phenomenon as described above occurs focusing on the surge prevention circuit 79 in FIG. 3. It is assumed here that the AC voltage Vac changes rapidly at time t13 in FIG. 6, and the rapid change in the AC voltage Vac subsides at time t16 in FIG. 7.

First, at time t10, when the driving signal Vq1 goes low to turn off the NMOS transistor 26, the edge detection circuit 100 of the surge prevention circuit 79 outputs the high pulse signal Vs1 for sampling the voltage Vcs.

In this timing, since the inductor current IL is smaller than the limit value Lim, the signal Vp5 of the comparator 105 is low. Accordingly, the sampling inhibition circuit 101 outputs the pulse signal Vs1 to the sample-and-hold circuit 102 as the pulse signal Vs2 without inhibiting the sampling of the inductor current IL.

The sample-and-hold circuit 102 holds, as the voltage Vs3, the voltage Vcs indicating the inductor current IL at time t10. However, since the voltage Vd1 that is "predetermined times X" greater than this voltage Vs3 at time t10 is lower than the voltage Vref2, the "voltage Vref2" is outputted as the limit voltage Vlimit.

After the NMOS transistor 26 is turned off, when the inductor current IL reaches the "current value Ia", which is substantially zero (for example, described in FIG. 4) at time t11, the driving signal Vq1 goes high, and the NMOS transistor 26 is turned on. As a result, the inductor current IL increases. In FIGS. 6 and 7, the "current value Ia" indicating that the inductor current IL is substantially zero is omitted for the sake of convenience.

When the ramp wave Vr exceeds the voltage Ve at time t12, similarly to the time t2 in FIG. 4, the driving signal Vq1 goes low, and the NMOS transistor 26 is turned off again. As a result, the sample-and-hold circuit 102 holds, as the voltage Vs3, the voltage Vcs indicating the inductor current IL at time t12.

Here, the voltage Vd1 that is "predetermined times X" greater than the voltage Vs3 at time t12 is higher than the voltage Vref2, and thus the "voltage Vd1" is outputted as the limit voltage Vlimit. Hereinafter, each time the driving signal Vq1 goes low to turn off the NMOS transistor 26, the operation at time t12 is repeated. Accordingly, the limit value Lim limiting the inductor current IL increases in a stepwise manner with an increase in the inductor current IL.

When the AC voltage Vac changes rapidly and rises at time t13, the level of the rectified voltage Vrec rises as well. When the inductor current IL increases to be greater than the limit value Lim, the comparator 105 outputs the high signal Vp5. As a result, the SR flip-flop 81 in FIG. 2 changes the level of the driving signal Vq1, which is the Q output, to low at time t14, and thus the NMOS transistor 26 is turned off.

When the driving signal Vq1 goes low at time t14, the high signal Vp5 is held by the D flip-flop 120, and thus the Q output of the D flip-flop 120 goes high. Accordingly, at time t14 and thereafter, the sampling inhibition circuit 101 inhibits the sample-and-hold circuit 102 from sampling the voltage Vcs. As a result, the value at time t14 is held as the limit value Lim.

At time t15 and thereafter, the operations of turning on the NMOS transistor 26 in response to the inductor current IL reaching zero and turning off the NMOS transistor 26 in response to the inductor current IL reaching the limit value Lim at time t14 are repeated.

At time t16 in FIG. 7, the rapid change in the AC voltage Vac subsides, and a predetermined waveform of the AC voltage Vac is obtained. As a result, the inductor current IL becomes smaller than the limit value Lim, and the circuits of the power factor correction IC 25 perform the normal operations described in FIG. 4, for example.

Then, at time t17, the ramp wave Vr exceeds the voltage Ve, the driving signal Vq1 goes low, and the NMOS transistor 26 is turned off.

In addition, at time t17, since the voltage Vcs is lower than the limit voltage Vlimit, the low signal Vp5 is outputted from the comparator 105. Accordingly, the Q output of the D flip-flop 120 is changed to low.

At time t18 and thereafter, the sample-and-hold circuit 102 samples the voltage Vcs and updates the limit voltage Vlimit each time the NMOS transistor 26 is turned off. The voltage Vd1 continues to be outputted as the limit voltage Vlimit until the voltage Vd1 drops below the voltage Vref2 at time t19.

Then, the voltage Vd1 drops below the voltage Vref2 at time t19, the voltage Vref2 is outputted as the limit voltage Vlimit. This prevents the limit value Lim from dropping too low even in a region in which the phase angle is close to 0° and the inductor current IL decreases. As a result, it is possible to stably operate the surge prevention circuit 79 even in a region in which the inductor current IL is small.

Other Examples

Figure 8:
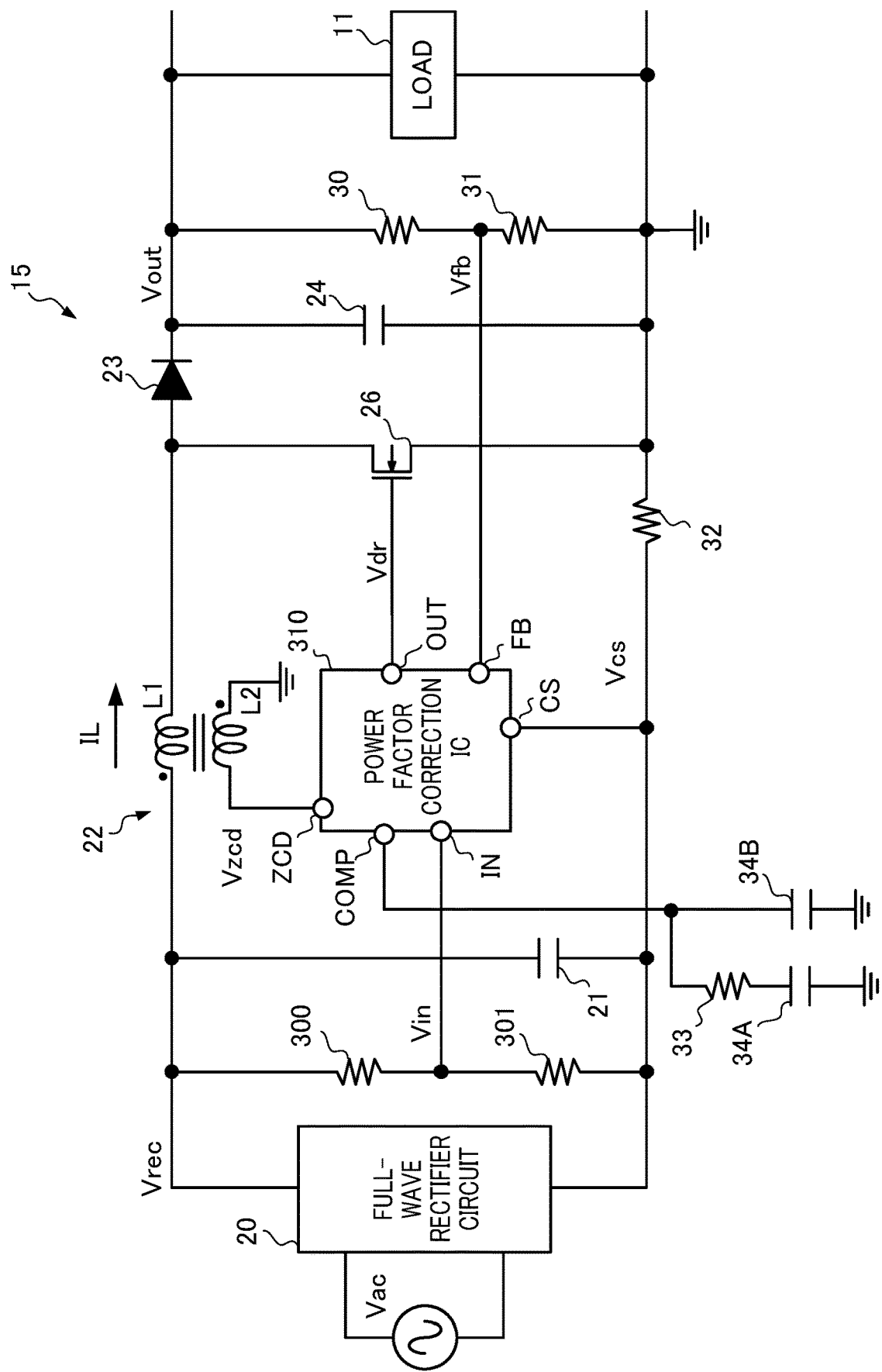
FIG. 8 is a diagram illustrating an example of an AC-DC converter 15.

FIG. 8 is a diagram illustrating an example of an AC-DC converter 15. The AC-DC converter 15 includes the full-wave rectifier circuit 20, the capacitors 21, 24, 34A, and 34B, the transformer 22, the diode 23, a power factor correction IC 310, the NMOS transistor 26, the resistors 30 to 33, and resistors 300 and 301.

Hereinafter, the blocks of the AC-DC converter 15 that are the same as those of the AC-DC converter 10 in FIG. 1 are given the same reference signs. Accordingly, the following describes the resistors 300 and 301 and the power factor correction IC 310.

The resistors 300 and 301 configure a voltage divider circuit that divides the rectified voltage Vrec to generate a voltage having a shape similar to a shape of the rectified voltage Vrec. It is assumed that the voltage obtained by dividing the rectified voltage Vrec using the resistors 300 and 301 is a voltage Vin.

The power factor correction IC 310 is an integrated circuit that switches the NMOS transistor 26, similarly to the power factor correction IC 25, and has a terminal IN to which the voltage Vin is applied, in addition to the five terminals of the power factor correction IC 25.

<<Power Factor Correction IC 310>>

Figure 9:
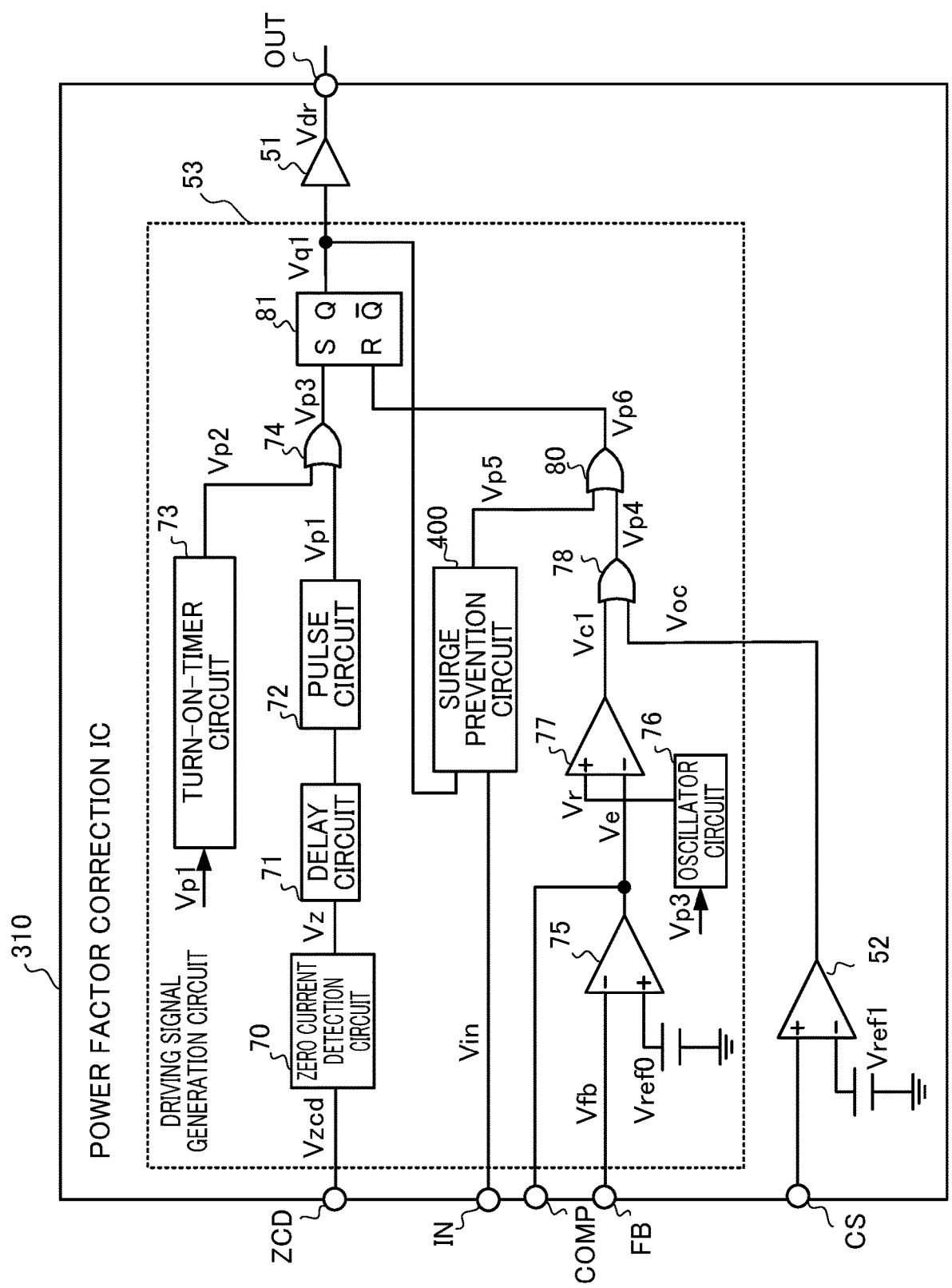
FIG. 9 is a diagram illustrating an example of a power factor correction IC 310.
Figure 10:
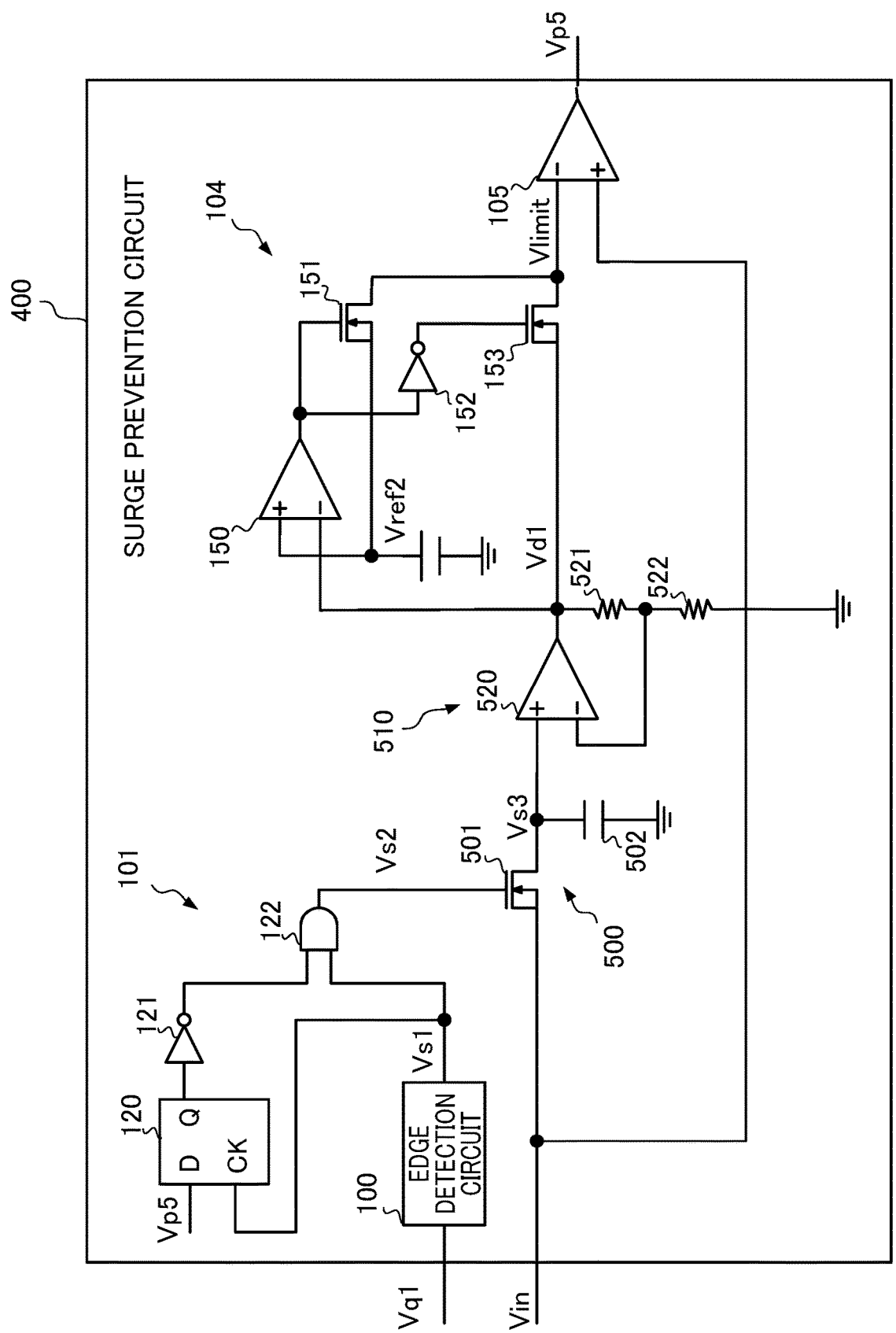
FIG. 10 is a diagram illustrating an example of a surge prevention circuit 400.

FIG. 9 is a diagram illustrating an example of the power factor correction IC 310. The power factor correction IC 310 uses a driving signal generation circuit 53 instead of the driving signal generation circuit 50 of the power factor correction IC 25 in FIG. 2. In the driving signal generation circuit 53, a surge prevention circuit 400 is used instead of the surge prevention circuit 79. Accordingly, the following describes the surge prevention circuit 400.

<<Surge Prevention Circuit 400>>

In the surge prevention circuit 400, a sample-and-hold circuit 500 is used instead of the sample-and-hold circuit 102 of the surge prevention circuit 79, and an amplifier circuit 510 is used instead of the amplifier circuit 103.

The sample-and-hold circuit 500 samples the voltage Vin based on the signal Vs2, and includes an NMOS transistor 501 and a capacitor 502.

The amplifier circuit 510 generates the voltage Vd1 indicating the limit value Lim based on the voltage Vin held by the sample-and-hold circuit 500, and includes an operational amplifier 520 and resistors 521 and 522.

In this case, the inductor current IL is IL=(Ton×Vrec)/L, where "Ton" is on time of the NMOS transistor 26, and "L" is an inductance value of the primary coil L1. Thus, the inductor current IL and the voltage Vin corresponding to the rectified voltage Vrec have shapes similar to each other.

Thus, similarly to the amplifier circuit 103 described above, the amplifier circuit 510 can generate the voltage Vd1 indicating the limit value Lim based on the voltage Vin. As a result, it is possible to prevent the surge voltage from being generated in the NMOS transistor 26 when using the surge prevention circuit 400 as well.

===SUMMARY===

The AC-DC converters 10 and 15 according to embodiments of the present disclosure have been described above. For example, in the power factor correction IC 25, the limit value Lim limiting the inductor current IL is generated based on the previously sampled voltage Vcs. Accordingly, it is possible to change the limit value Lim according to the inductor current IL, thereby being able to prevent the generation of the surge voltage in the NMOS transistor 26. As a result, the NMOS transistor 26 is protected appropriately.

In addition, it is also possible to prevent the surge voltage by using the power factor correction IC 310 that samples the voltage Vin obtained by dividing the rectified voltage Vrec as illustrated in FIG. 8. However, in the power factor correction IC 25 in FIG. 1, there is no need to divide the rectified voltage Vrec with the resistors 300 and 301. Accordingly, the power factor correction IC 25 is able to further reduce the power consumption.

Moreover, the sample-and-hold circuit 102 samples the voltage Vcs corresponding to the inductor current IL in the timing when the NMOS transistor 26 is turned off, for example. In other words, the sample-and-hold circuit 102 obtains the voltage Vcs indicating a peak value (i.e., maximum value) of the inductor current IL. In an embodiment of the present disclosure, the limit value Lim is generated based on the peak value of the inductor current IL, thereby being able to prevent the surge voltage appropriately.

Furthermore, when the inductor current IL reaches the limit value Lim, the sampling inhibition circuit 101 inhibits the sample-and-hold circuit 102 from sampling the voltage Vcs. As a result, the limit value Lim is maintained, and the inductor current IL equal to or greater than the limit value Lim is not passed. Accordingly, the NMOS transistor 26 is protected appropriately.

In addition, the inductor current IL is considerably small when the phase angle is close to 0° in general, and thus if the limit value Lim is generated based on a voltage Vcs corresponding to such an inductor current IL, the inductor current IL may be limited even in a condition where no surge voltage is generated. However, in an embodiment of the present disclosure, the limit value Lim does not decrease smaller than the predetermined "current value Ic". Accordingly, for example, the surge prevention circuit 79 can suppress the generation of the surge voltage appropriately, regardless of the range of the phase angle of the AC voltage Vac.

Moreover, the limit value Lim is generated based on the sampled voltage Vcs, and thus the limit value Lim increases as the sampled voltage Vcs increases.

Furthermore, the limit value Lim can be adjusted based on the resistance ratio of the resistors 141 and 142. Accordingly, it is possible to set an appropriate limit value Lim according to the inductance value of the primary coil L1, the cycle of the driving signal Vq1, the on time of the NMOS transistor 26, and the like.

In addition, the power factor correction IC 25 includes the comparator 52 that turns off the NMOS transistor 26 upon the occurrence of overcurrent in the inductor current IL. Accordingly, it is possible to prevent the NMOS transistor 26 from being broken due to overcurrent.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

According to the present disclosure, it is possible to provide an integrated circuit capable of appropriately protecting a transistor that controls an inductor current.

What is claimed is:

1. An integrated circuit for a power supply circuit configured to generate an output voltage from an alternating-current (AC) voltage inputted thereto, the power supply circuit including
   a rectifier circuit configured to rectify the AC voltage,
   an inductor configured to receive a rectified voltage from the rectifier circuit, and a transistor configured to control an inductor current flowing through the inductor, the integrated circuit being configured to switch the transistor based on the inductor current and the output voltage, the integrated circuit comprising:
- a sample-and-hold circuit configured to sample and hold a voltage corresponding to the rectified voltage in a predetermined timing;
- an output circuit configured to output a limit voltage based on the voltage held by the sample-and-hold circuit, the limit voltage indicating a limit value for limiting the inductor current; and
- a first signal output circuit configured to receive the limit voltage and a voltage corresponding to the inductor current, and to thereby output a first signal to turn off the transistor upon determining that a current value of the inductor current exceeds the limit value.

2. The integrated circuit according to claim 1, wherein the voltage sampled and held by the sample-and-hold circuit is the voltage corresponding to the inductor current.

3. The integrated circuit according to claim 1, wherein the predetermined timing is a timing of turning off the transistor.

4. The integrated circuit according to claim 1, further comprising:
- a sampling inhibition circuit configured to inhibit the sample-and-hold circuit from sampling the voltage corresponding to the rectified voltage, upon receiving the first signal.

5. The integrated circuit according to claim 1, wherein the output circuit includes
- a voltage generation circuit configured to generate a first voltage for limiting the inductor current, based on the voltage held by the sample-and-hold circuit, and
- a selection circuit configured to select, as the limit voltage, one of the first voltage and a second voltage, the second voltage limiting the inductor current to a predetermined current value to thereby increase the limit value.

6. The integrated circuit according to claim 5, wherein the voltage generation circuit generates the first voltage based on the voltage held by the sample-and-hold circuit, the first voltage indicating a current value that is predetermined times greater than the inductor current at a time when the sample-and-hold circuit performs sampling.

7. The integrated circuit according to claim 6, wherein the voltage generation circuit is an amplifier circuit configured to amplify the voltage held by the sample-and-hold circuit based on a predetermined resistance ratio, and output a resultant voltage as the first voltage.

8. The integrated circuit according to claim 1, further comprising:
- a second signal output circuit configured to output a second signal to turn off the transistor, upon occurrence of overcurrent in a current flowing through the transistor.

9. A power supply circuit configured to generate an output voltage from an alternating-current (AC) voltage inputted thereto, the power supply circuit comprising:
- a rectifier circuit configured to rectify the AC voltage;
- an inductor configured to receive a rectified voltage from the rectifier circuit;
- a transistor configured to control an inductor current flowing through the inductor; and
- an integrated circuit configured to switch the transistor based on the inductor current and the output voltage, the integrated circuit including
  - a sample-and-hold circuit configured to sample and hold a voltage corresponding to the rectified voltage in a predetermined timing,
  - an output circuit configured to output a limit voltage based on the voltage held by the sample-and-hold circuit, the limit voltage indicating a limit value for limiting the inductor current, and
  - a signal output circuit configured to receive the limit voltage and a voltage corresponding to the inductor current, and to thereby output a signal to turn off the transistor upon determining that a current value of the inductor current exceeds the limit value.

* * * * *